(12) United States Patent
Guillerm

(10) Patent No.: US 8,966,306 B2
(45) Date of Patent: Feb. 24, 2015

(54) SYSTEM AND METHOD FOR OPERATING AN ELECTRONIC DEVICE HAVING AN HDMI PORT THAT IS SHARED BETWEEN HDMI SOURCE FUNCTION AND AN HDMI SINK FUNCTION OF THE ELECTRONIC DEVICE

(75) Inventor: Nicolas Guillerm, Villons les Buissons (FR)

(73) Assignee: NXP, B.V., Eindhoven (NL)

( * ) Notice: Subject to any disclaimer, the term of this patent is extended or adjusted under 35 U.S.C. 154(b) by 488 days.

(21) Appl. No.: 13/100,899

(22) Filed: May 4, 2011

(65) Prior Publication Data
US 2011/0283129 A1 Nov. 17, 2011

(30) Foreign Application Priority Data

May 5, 2010 (EP) .................................... 10290241

(51) Int. Cl.

| | |
|---|---|
| G06F 1/00 | (2006.01) |
| G06F 11/30 | (2006.01) |
| G06F 1/26 | (2006.01) |
| G06F 3/00 | (2006.01) |
| G09G 5/00 | (2006.01) |
| H04N 5/44 | (2011.01) |
| H04N 21/4363 | (2011.01) |

(52) U.S. Cl.
CPC ............ *G09G 5/006* (2013.01); *G09G 2370/12* (2013.01); *H04N 5/4403* (2013.01); *H04N 21/43635* (2013.01)
USPC .............. 713/324; 713/340; 713/320; 710/17

(58) Field of Classification Search
CPC ......... H04L 29/06; G06F 13/00; G06F 11/30; G06F 11/3003
USPC .............................. 710/17; 713/320, 324, 340
See application file for complete search history.

(56) References Cited

U.S. PATENT DOCUMENTS

| | | | |
|---|---|---|---|
| 8,275,914 B2* | 9/2012 | Kim et al. ....................... | 710/15 |
| 2006/0095596 A1 | 5/2006 | Yung et al. | |
| 2008/0152024 A1 | 6/2008 | Takeuchi | |
| 2008/0205306 A1 | 8/2008 | Saito | |
| 2008/0299912 A1* | 12/2008 | Unger ............................. | 455/70 |
| 2009/0046690 A1* | 2/2009 | Hsieh ............................. | 370/342 |
| 2009/0141180 A1 | 6/2009 | Kondo et al. | |
| 2009/0174817 A1* | 7/2009 | Sato et al. ..................... | 348/554 |
| 2009/0288126 A1* | 11/2009 | Candelore et al. ............ | 725/110 |

OTHER PUBLICATIONS

High-Definition Multimedia Interface Specification, Version 1.3, Jun. 22, 2006.*
VESA DisplayPort Standard, Version 1, Revision 1a, Jan. 11, 2008.*
High-Definition Multimedia Interface Specification Version 1.3a, Nov. 10, 2006.*
"Introducing HDMI 1.4 Specification Features", HDMI LLC, retrieved from the Internet at: http://www.hdmi.org/download/press_kit/PressBriefing_HDMI1_4_Final_083109.pdf, 31 pgs. (2009).
Extended European Search Report for European Patent Application No. 10290241.8 (Aug. 12, 2010).

* cited by examiner

*Primary Examiner* — Farley Abad

(57) ABSTRACT

A system and method for operating an electronic device having a High-Definition Multimedia Interface port that is shared between an HDMI source function and an HDMI sink function of the electronic device utilizes detecting whether an external HDMI device that is attached to the HDMI port is one of an HDMI source and an HDMI sink. If the external HDMI device is detected as being an HDMI source, the HDMI sink function of the electronic device is enabled. If the external HDMI device is detected as being an HDMI sink, the HDMI source function of the electronic device is enabled.

19 Claims, 8 Drawing Sheets

SYSTEM AND METHOD FOR OPERATING AN ELECTRONIC DEVICE HAVING AN HDMI PORT THAT IS SHARED BETWEEN HDMI SOURCE FUNCTION AND AN HDMI SINK FUNCTION OF THE ELECTRONIC DEVICE

This application claims the priority under 35 U.S.C. §119 of European patent application No. 10290241.8, filed on May 5, 2010, the contents of which are incorporated by reference herein.

FIELD OF THE INVENTION

Embodiments of the invention relate generally to electronic systems and methods and, more particularly, to a system and method for operating an electronic device having a high-definition multimedia interface (HDMI) port.

BACKGROUND OF THE INVENTION

An electronic device having an HDMI port can act as an HDMI source and transmit multimedia data to an external device via the HDMI port. Alternatively, an electronic device having an HDMI port can act as an HDMI sink and receive multimedia data from an external device via the HDMI port.

When an electronic device has both an HDMI source function and an HDMI sink function, the electronic device usually needs to provide a dedicated HDMI port for each of the HDMI source function and the HDMI sink function. However, having two identical HDMI ports increases the component cost of the electronic device. Additionally, the electronic device needs to label these two identical HDMI ports differently in order to allow an external HDMI source and an external HDMI sink to correctly attach to their dedicated HDMI ports. As a result, the manufacturing cost of the electronic device is increased. Furthermore, certain electronic device such as a mobile phone has a limited size and/or a limited surface area, which cannot hold two separate HDMI ports.

SUMMARY OF THE INVENTION

A system and method for operating an electronic device having an HDMI port that is shared between an HDMI source function and an HDMI sink function of the electronic device utilizes detecting whether an external HDMI device that is attached to the HDMI port is one of an HDMI source and an HDMI sink. If the external HDMI device is detected as being an HDMI source, the HDMI sink function of the electronic device is enabled. If the external HDMI device is detected as being an HDMI sink, the HDMI source function of the electronic device is enabled. By detecting whether an external HDMI device that is attached to the HDMI port is one of an HDMI source and an HDMI sink and enabling the corresponding HDMI sink function and HDMI source function of the electronic device, the electronic device does not need to provide a dedicated HDMI port for each of the HDMI source function and the HDMI sink function.

In an embodiment, a method for operating an electronic device having an HDMI port that is shared between an HDMI source function and an HDMI sink function of the electronic device includes detecting whether an external HDMI device that is attached to the HDMI port is one of an HDMI source and an HDMI sink, if the external HDMI device is detected as being an HDMI source, enabling the HDMI sink function of the electronic device, and if the external HDMI device is detected as being an HDMI sink, enabling the HDMI source function of the electronic device.

In an embodiment, a system for operating an electronic device having an HDMI port that is shared between an HDMI source function and an HDMI sink function of the electronic device includes a detecting unit configured to detect whether an external HDMI device that is attached to the HDMI port is one of an HDMI source and an HDMI sink and a control unit configured to enable the HDMI sink function of the electronic device if the external HDMI device is detected as being an HDMI source and to enable the HDMI source function of the electronic device if the external HDMI device is detected as being an HDMI sink.

In an embodiment, an electronic device includes an HDMI source unit configured to perform an HDMI source function, an HDMI sink unit configured to perform an HDMI sink function, an HDMI port that is shared between the HDMI source unit and the HDMI sink unit, a detecting unit configured to detect whether an external HDMI device that is attached to the HDMI port is one of an HDMI source and an HDMI sink, and a control unit configured to enable the HDMI sink function of the electronic device if the external HDMI device is detected as being an HDMI source and to enable the HDMI source function of the electronic device if the external HDMI device is detected as being an HDMI sink.

Other aspects and advantages of embodiments of the present invention will become apparent from the following detailed description, taken in conjunction with the accompanying drawings, depicting by way of example the principles of the invention.

BRIEF DESCRIPTION OF THE DRAWINGS

Throughout the description, similar reference numbers may be used to identify similar elements.

DETAILED DESCRIPTION OF THE EMBODIMENTS

It will be readily understood that the components of the embodiments as generally described herein and illustrated in the appended Figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
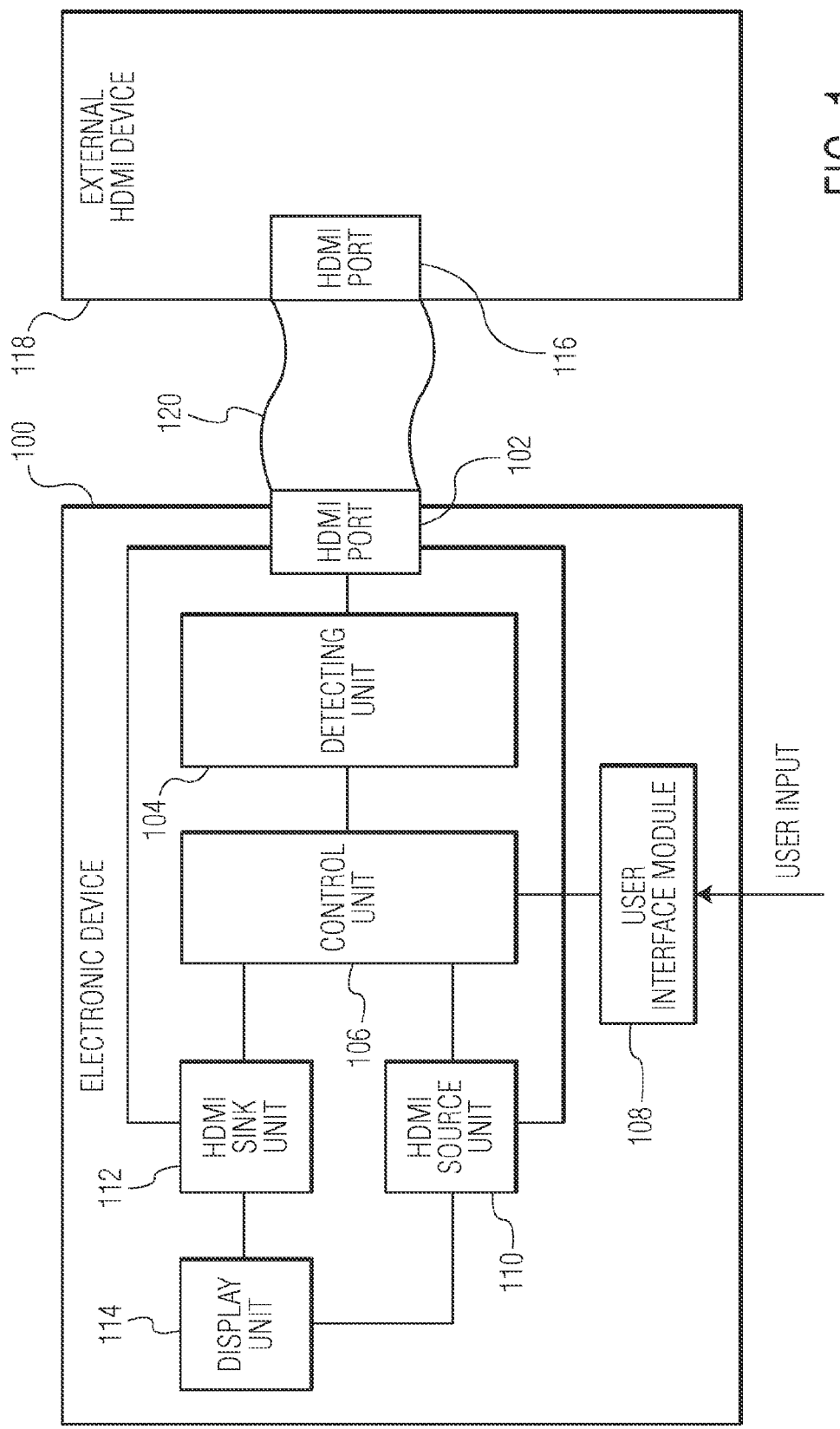
FIG. 1 shows a schematic block diagram of an electronic device in accordance with an embodiment of the invention.

FIG. 1 shows a schematic block diagram of an electronic device 100 in accordance with an embodiment of the invention. The electronic device may be any kind of electronic device that has both an HDMI source function and an HDMI sink function. The electronic device may be a discrete circuit that includes multiple discrete components or an integrated circuit (IC) such as a fully embedded system. In an embodiment, the electronic device is a mobile phone that has dual HDMI functions. Acting as an HDMI source, the mobile phone transmits multimedia data such as video and photo content to an external display device such as a TV for displaying. Acting as an HDMI sink, the mobile phone receives multimedia data such as video and photo content from an external device and displays the received multimedia data using a pico projector that is built into the mobile phone. In another embodiment, the electronic device is a portable media player that plays received multimedia content from an external HDMI source device and transmits stored multimedia content to an external display. In another embodiment, the electronic device is an HDMI repeater that has one or more HDMI inputs and one or more HDMI outputs and simultaneously behaves as both an HDMI sink and an HDMI source.

In the embodiment depicted in FIG. 1, the electronic device 100 includes an HDMI port 102, a detecting unit 104, a control unit 106, an optional user interface module 108, an HDMI source unit 110, an HDMI sink unit 112 and an optional display unit 114. Although the electronic device is depicted and described with certain components and functionalities, other embodiments of the electronic device may include fewer or more components to implement less or more functionalities. Although the detecting unit and the control unit are shown in FIG. 1 as being separate from the HDMI source unit and the HDMI sink unit, the detecting unit and the control unit may be partially or completely integrated with the HDMI source unit and/or the HDMI sink unit in other embodiments.

The HDMI port 102 of the electronic device 100 is configured to be shared between the HDMI source function and the HDMI sink function of the electronic device. Although the electronic device is shown in FIG. 1 as having only one HDMI port, the electronic device may have more than one HDMI port in other embodiments. In an embodiment, the HDMI port is the only HDMI port that is shared between the HDMI source function and the HDMI sink function of the electronic device. In the embodiment depicted in FIG. 1, the HDMI port of the electronic device is connected to an HDMI port 116 of an external HDMI device 118 via an HDMI link 120. The external HDMI device may be either an HDMI sink or an HDMI source. The HDMI link may be an HDMI connector that includes an HDMI cable with two HDMI plugs. In an embodiment, the external HDMI device includes an HDMI plug that can be directly attached to the HDMI port of the electronic device.

The detecting unit 104 of the electronic device 100 is configured to detect whether the external HDMI device 118 is either an HDMI source or an HDMI sink. In the embodiment depicted in FIG. 1, the detecting unit is coupled to the HDMI port 102. The detecting unit may be configured to measure voltage levels or current levels of HDMI signals through the HDMI port between the electronic device and the external HDMI device.

The control unit 106 of the electronic device 100 is configured to enable the HDMI sink function of the electronic device if the external HDMI device 118 is detected as being an HDMI source and to enable the HDMI source function of the electronic device if the external HDMI device is detected as being an HDMI sink. The control unit may be implemented as switch circuits, which are controlled by the detecting unit to switch the HDMI source unit and the HDMI sink unit on or off based on the detecting result. The control unit may be configured to automatically enable the HDMI source function or the HDMI sink function based on the detecting results from the detecting unit 104.

The optional user interface module 108 of the electronic device 100 is configured to provide a user interface for receiving user input from at least one user of the electronic device. In the embodiment depicted in FIG. 1, the control unit 106 is further configured to propose to the user of the electronic device to enable the HDMI source function or the HDMI sink function via the user interface. The user interface module may include a display device configured to display a notice to the user and an input device such as a keyboard configured to receive the input from the user.

By sharing the HDMI port 102 between the HDMI source function and the HDMI sink function of the electronic device 100, the electronic device does not need to provide a dedicated HDMI port for each of the HDMI source function and the HDMI sink function. Comparing to having two identical but separate HDMI ports for the HDMI source function and the HDMI sink function, sharing one HDMI port between the HDMI source function and the HDMI sink function lowers the component cost of the electronic device. Additionally, the electronic device no longer needs to label two HDMI ports differently. As a result, the manufacturing cost of the electronic device is reduced. Furthermore, an electronic device with a limited size and/or a limited surface area that cannot hold two separate HDMI ports can still provide HDMI access for both the HDMI source function and the HDMI sink function of the electronic device.

Figure 2:
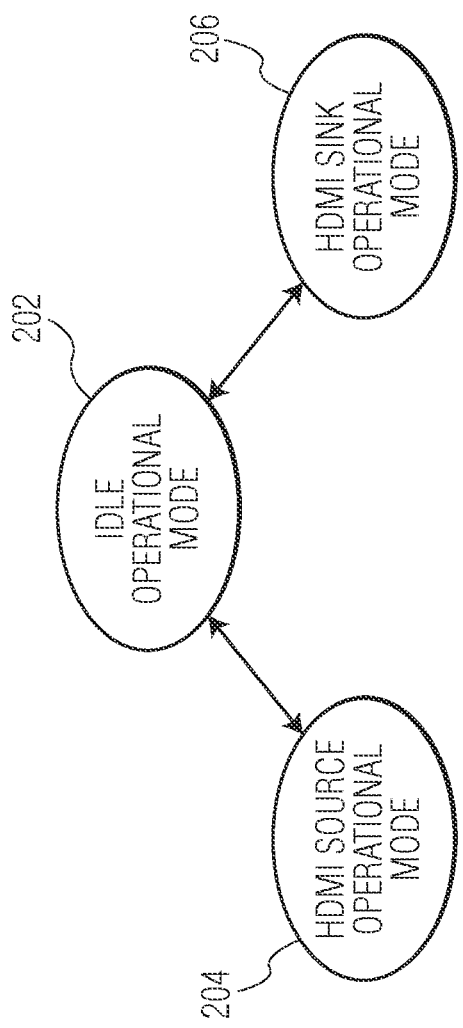
FIG. 2 illustrates three operational modes of the electronic device depicted in FIG. 1.

In an embodiment, the electronic device 100 is configured to operate in multiple different operational modes. In this embodiment, the control unit 106 is configured to switch the electronic device from operating in one operational mode to operating in another operational mode. FIG. 2 illustrates three operational modes 202, 204, 206 of the electronic device depicted in FIG. 1. As shown in FIG. 2, the three different operational modes consist of an idle operational mode 202, an HDMI source operational mode 204 and an HDMI sink operational mode 206.

In the idle operational mode 202, the electronic device 100 is configured to conserve power and to continuously monitor the HDMI port 102 that is shared between the HDMI source function and the HDMI sink function of the electronic device. The electronic device consumes less power operating in the idle operational mode than operating in the HDMI sink operational mode 206 or in the HDMI source operational mode 204. In the idle operational mode, the electronic device is not operating as an HDMI source or as an HDMI sink. In an embodiment, the control unit 106 is configured to keep the electronic device operating in the idle operational mode when the external HDMI device 118 is powered off. In another embodiment, the control unit is configured to force the electronic device to switch from operating in the idle operational mode to operating in the HDMI source operational mode when the external HDMI device is powered off after a time out period expires.

The control unit 106 is configured to enable the HDMI source function of the electronic device 100 by switching the electronic device from operating in the idle operational mode 202 to operating in an HDMI source operational mode 204. In the HDMI source operational mode, the HDMI source function is enabled and the electronic device acts as an HDMI source. For example, the HDMI source unit 110 is enabled by the control unit to transmit multimedia data signals to the external HDMI device 118 via the HDMI port 102. In an embodiment, only one of the HDMI source unit and the HDMI sink unit 112 is enabled or activated by the control unit. When the HDMI source unit is enabled or activated by the control unit, the HDMI sink unit is disabled or inactivated by the control unit. When the HDMI sink unit is enabled or activated by the control unit, the HDMI source unit is disabled or inactivated by the control unit.

The control unit 106 is configured to enable the HDMI sink function of the electronic device 100 by switching the electronic device from operating in the idle operational mode 202 to operating in the HDMI sink operational mode 206. In the HDMI sink operational mode, the HDMI sink function is enabled and the electronic device acts as an HDMI sink. For example, the HDMI sink unit 112 is enabled by the control unit to receive multimedia data signals from the external HDMI device 118 via the HDMI port 102.

In an embodiment, the electronic device 100 and the external HDMI device 118 are manufactured according to the HDMI specification. If the electronic device mistakenly enables the HDMI source function when the external HDMI device is an HDMI source and if the electronic device mistakenly enables the HDMI sink function when the external HDMI device is an HDMI sink, the electronic device and the external HDMI device cannot be damaged because of the mandatory requirements of the HDMI specification.

Referring back to FIG. 1, the HDMI source unit 110 of the electronic device 100 is configured to perform the HDMI source function, i.e., to transmit multimedia data signals from the electronic device to the external HDMI device 118 via the HDMI port 102 of the electronic device. In the embodiment depicted in FIG. 1, the HDMI source unit is directly coupled to the HDMI port of the electronic device. In some embodiments, the HDMI source unit is connected to the HDMI port of the electronic device through the control unit only.

Figure 3:
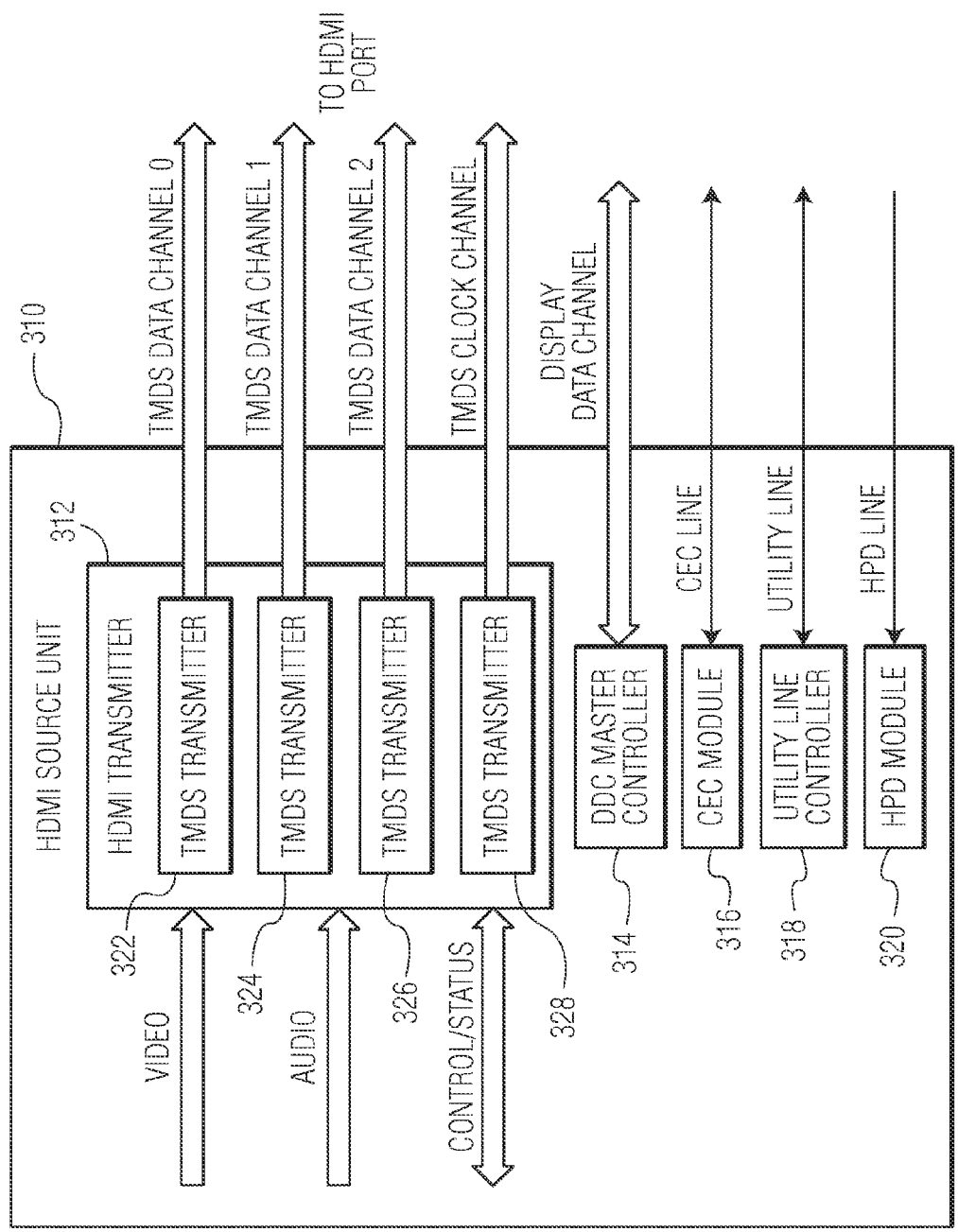
FIG. 3 depicts an embodiment of an HDMI source unit depicted in FIG. 1.

FIG. 3 depicts an embodiment of the HDMI source unit 110 of the electronic device 100 depicted in FIG. 1. As shown in FIG. 3, an HDMI source unit 310 includes an HDMI transmitter 312, a Display Data Channel (DDC) master controller 314, an optional Consumer Electronics Control (CEC) module 316, a Utility line controller 318 and a Hot Plug Detect (HPD) module 320.

The HDMI transmitter 312 of the HDMI source unit 310 is configured to drive four differential TMDS output pairs, i.e., four pairs of output TMDS differential signals, into the HDMI port 102. A differential TMDS output pair is a differential signal that is carried by two wires. One wire carries a positive copy "D+" of a signal "D" and another wire carries a negative copy "D−" of the signal D. The value of the differential signal is the voltage difference between the positive copy D+ and the negative copy D−. In the embodiment depicted in FIG. 3, the HDMI transmitter includes four TMDS transmitters 322, 324, 326, 328 and each of the four TMDS transmitters handles one of the four differential pairs. The four differential pairs are transmitted by the four TMDS transmitters through four TMDS communications channels. The four TMDS communications channels include three TMDS data channels "0," "1" and "2" and one TMDS clock channel. The three TMDS data channels 0, 1 and 2 are used to carry video, audio and auxiliary data such as channel control and status information. The TMDS clock channel is used to carry clock signals that are used by an external HDMI receiver that is connected to the electronic device 100 through the HDMI port 102 as a frequency reference for data recovery on the three TMDS data channels 0, 1 and 2. The clock frequency of the differential TMDS output pair of the TMDS clock channel is equal to a fraction of the bit rate of each of the three TMDS data channels 0, 1 and 2. In an embodiment, the clock frequency of the differential pair of the TMDS clock channel is equal to 1/10 of the bit rate of each of the three TMDS data channels 0, 1 and 2. For example, the frequency of the clock signal is 225 Million Hertz when the bit rate of each of the TMDS data channels 0, 1 and 2 is 2.25 Gigabits per second.

The DDC master controller 314 of the HDMI source unit 310 is configured to exchange configuration and status information with an external HDMI sink that is connected to the electronic device 100 through the HDMI port 102. In an embodiment, the DDC master controller reads the HDMI sink's Enhanced Extended Display Identification Data (E-EDID) to discover the HDMI sink's configuration and/or capabilities. The DDC master controller is also known as the DDC source. The optional CEC module 316 of the HDMI source unit is configured to provide high-level control functions between various audiovisual products in a user's environment. The DDC master controller and the CEC module can categorized as HDMI bus components.

The Utility line controller 318 of the HDMI source unit 310 is configured to transmit and to receive at least one Utility signal in the Utility line. The Utility signal includes information related to extended optional HDMI features such as HDMI Ethernet and Audio Return Channel (HEAC), which provides Ethernet compatible data networking between connected devices and/or an Audio Return Channel in the opposite direction from the TMDS channels. The HPD module 320 of the HDMI source unit is configured to detect the Hot Plug Detect signal in the HPD line from an external HDMI sink that is connected to the electronic device 100 through the HDMI port 102. The Utility line controller and the HPD module can be categorized as HDMI connection components.

Referring back to FIG. 1, the HDMI sink unit 112 of the electronic device 100 is configured to perform the HDMI sink function, i.e., to receive multimedia data signals at the electronic device from the external HDMI device 118 via the HDMI port 102 of the electronic device. In the embodiment depicted in FIG. 1, the HDMI sink unit is directly coupled to the HDMI port of the electronic device. In some embodiments, the HDMI sink unit is connected to the HDMI port of the electronic device through the control unit 106 only.

Figure 4:
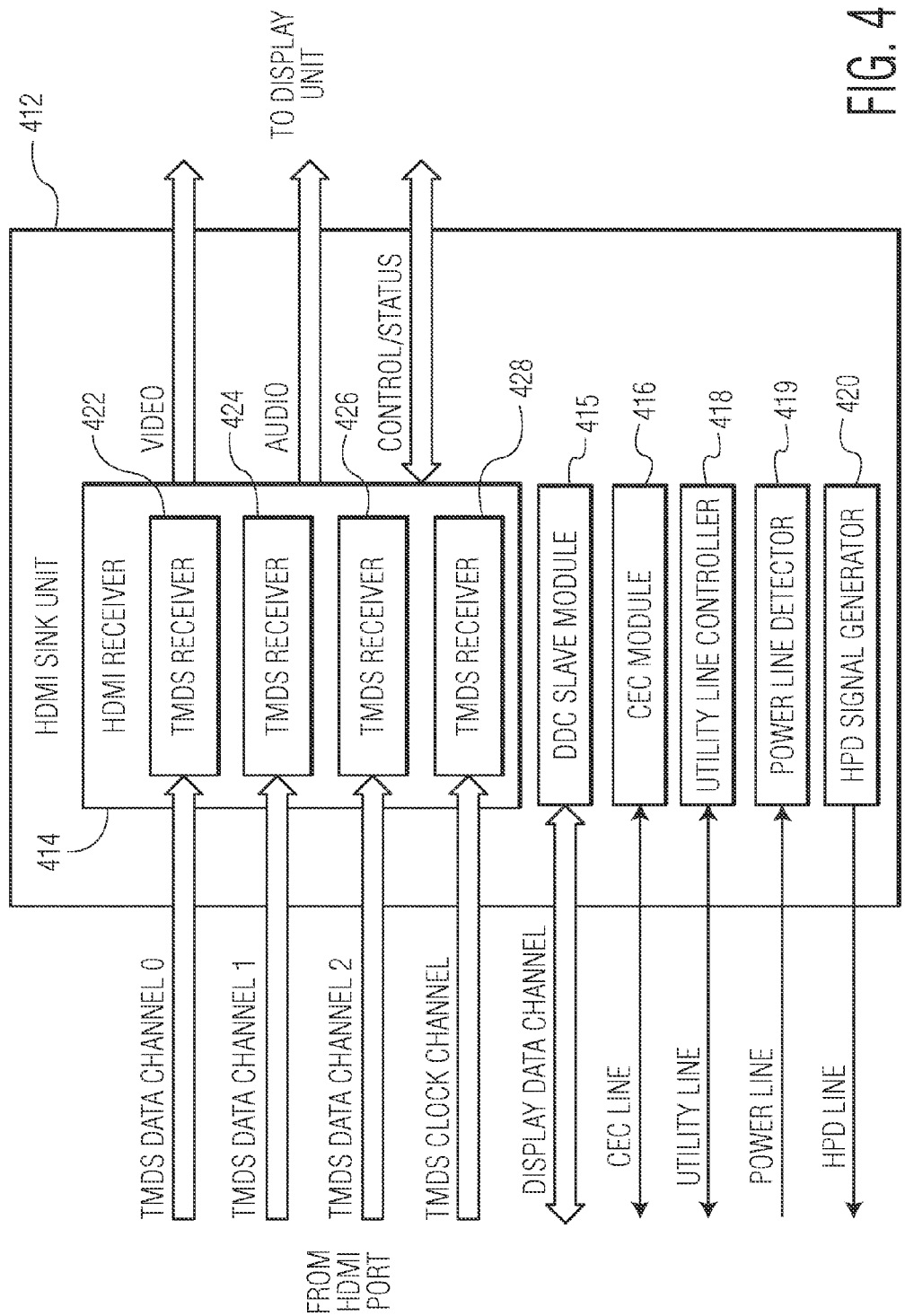
FIG. 4 depicts an embodiment of an HDMI sink unit depicted in FIG. 1.

FIG. 4 depicts an embodiment of the HDMI sink unit 112 of the electronic device 100 depicted in FIG. 1. As shown in FIG. 4, an HDMI sink unit 412 includes an HDMI receiver 414, a DDC slave module 415, an optional Consumer Electronics Control (CEC) module 416, a Utility line controller 418, a Power line detector 419 and an HPD signal generator 420.

The HDMI receiver 414 of the HDMI sink unit 412 is configured to receive four TMDS output pairs from the HDMI port 102 and to decode the received signals into one or more TMDS decoded words. The HDMI receiver includes four TMDS receivers 422, 424, 426, 428 and each of the four TMDS receivers handles one of the four differential pairs. The four differential pairs are received by the four TMDS receivers through three TMDS data channels 0, 1 and 2 and one TMDS clock channel.

The DDC slave module 415 of the HDMI sink unit 412 is configured to exchange configuration and status information with an external HDMI source that is connected to the electronic device 100 through the HDMI port 102. The DDC slave module is also known as a DDC sink. In an embodiment, the DDC source is an E-EDID Read-only memory (ROM). The CEC module 416 of the HDMI sink unit is similar to or same as the CEC module 316 of the HDMI source unit 310. The Utility line controller 418 of the HDMI sink unit is similar to or same as the Utility line controller 318 of the HDMI source unit. The Power line detector 419 of the HDMI sink unit is configured to detect a voltage level of a Power signal that is presented in a Power line from an external HDMI source that is connected to the electronic device through the HDMI port 102. The HPD signal generator 420 of the HDMI sink unit is configured to generate the Hot Plug Detect signal for an external HDMI source that is connected to the electronic device through the HDMI port.

Figure 5:
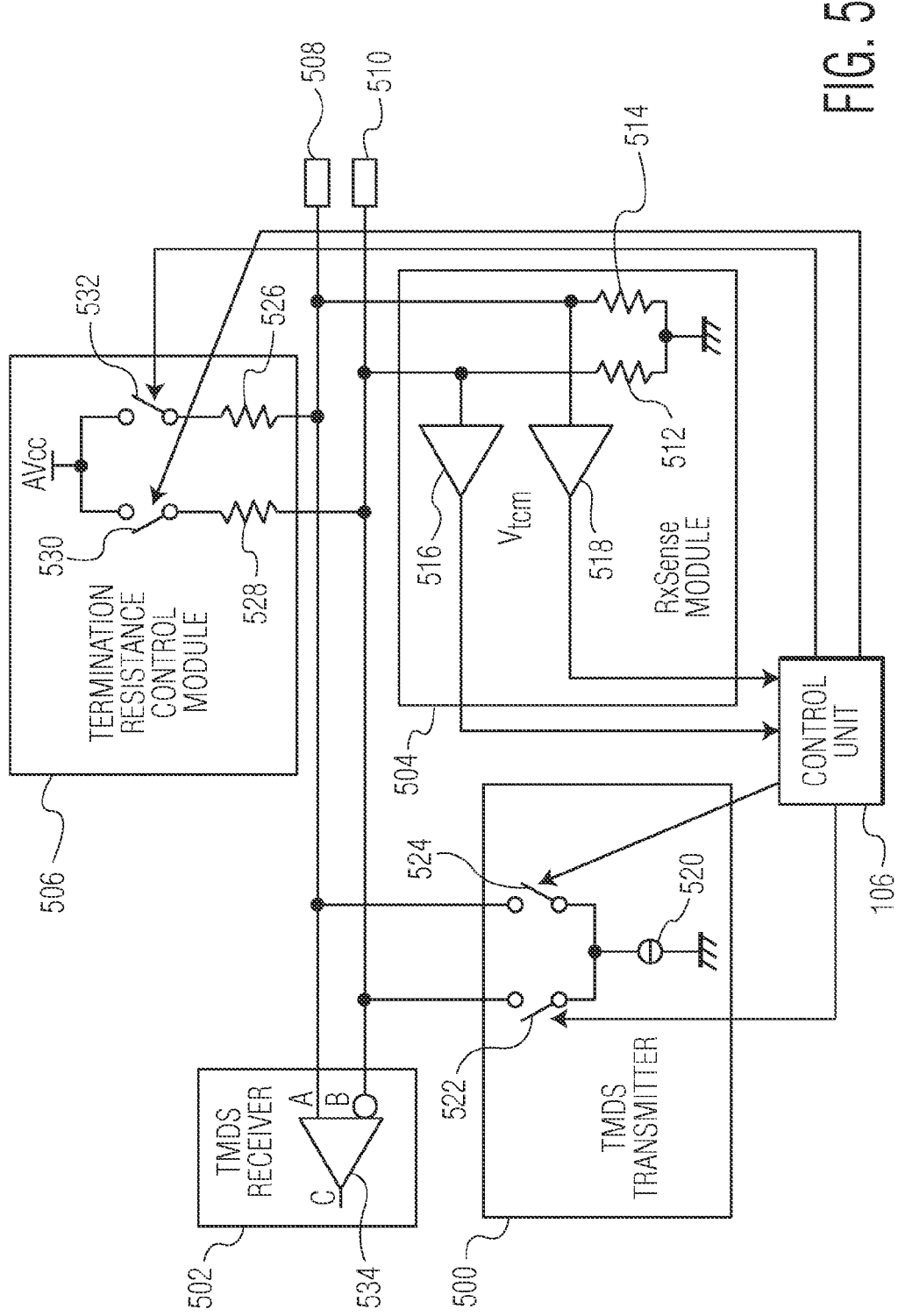
FIG. 5 shows HDMI Transition Minimized Differential Signaling (TMDS) components of the electronic device depicted in FIG. 1 in accordance with an embodiment of the invention.
Figure 6:
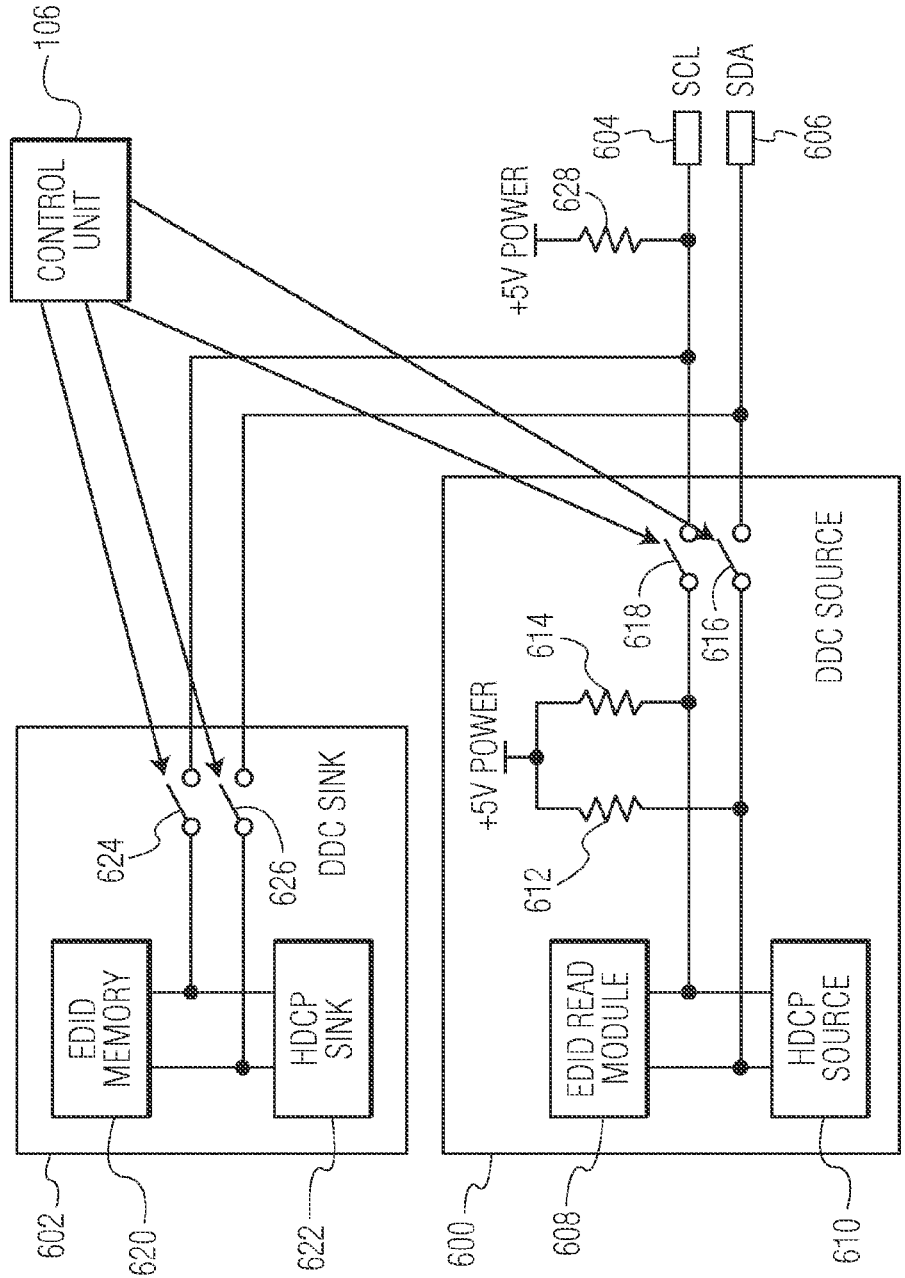
FIG. 6 shows HDMI bus components of the electronic device depicted in FIG. 1 in accordance with an embodiment of the invention.
Figure 7:
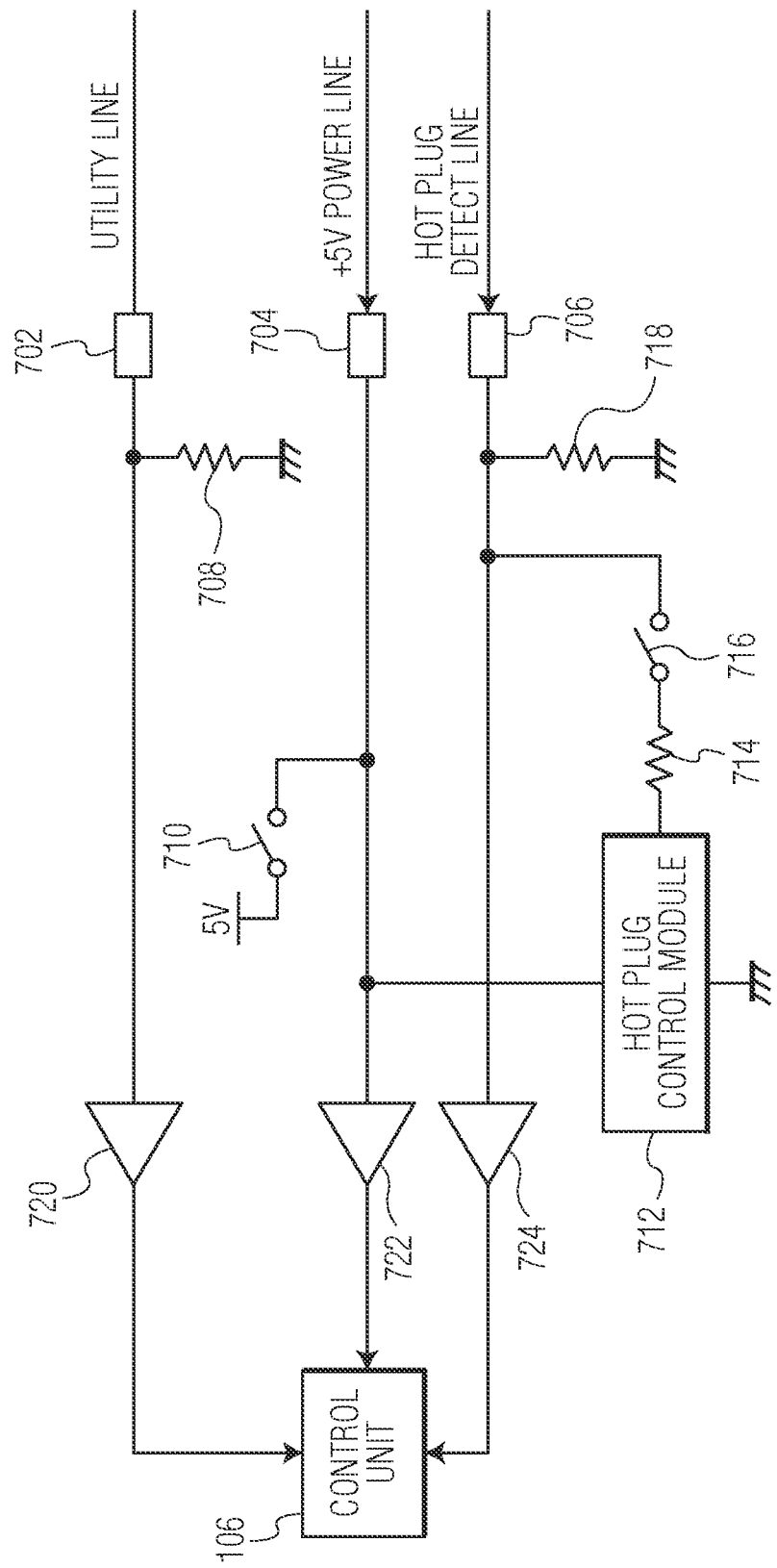
FIG. 7 shows HDMI connection components of the electronic device depicted in FIG. 1 in accordance with an embodiment of the invention.

Components of the HDMI source unit 310 and the HDMI sink unit 412 depicted in FIGS. 3 and 4 can be categorized as TMDS components, HDMI bus components, and HDMI connection components. For example, the HDMI transmitter 312 of the HDMI source unit and the HDMI receiver 414 of the HDMI sink unit are categorized as TMDS components. The DDC master controller 314 and the CEC module 316 of the HDMI source unit and the DDC slave module 415 and the CEC module 416 of the HDMI sink unit are categorized as HDMI bus components. The Utility line controller 318 and the HPD module 420 of the HDMI source unit and the Utility line controller 418 and the HPD signal generator 420 of the HDMI sink unit are categorized as HDMI connection components. Components of the detecting unit 104 and the control unit 106 depicted in FIG. 1 can be embedded with the HDMI TMDS components, the HDMI bus components, and the HDMI connection components of the HDMI source unit and the HDMI sink unit. FIGS. 5-7 show some examples of such HDMI TMDS components, HDMI bus components, and HDMI connection components. Although the voltage levels and the resistors in the embodiments depicted in FIGS. 5-7 have specific voltage and resistance values, the voltage levels and the resistors may have different voltage and resistance values in other embodiments.

FIG. 5 shows some HDMI TMDS components of the electronic device 100 depicted in FIG. 1 in accordance with an embodiment of the invention. As shown in FIG. 5, a TMDS transmitter 500 of the HDMI source unit 310, a TMDS receiver 502 of the HDMI sink unit 412, a receiver sensing (RxSense) module 504 and a termination resistance control module 506 of the detecting unit 104 are attached to two TMDS terminals 508, 510. The two TMDS terminals are connected to two wires of a TMDS differential output pair so as to receive the TMDS differential output pair. The TMDS transmitter in the embodiment depicted in FIG. 5 may be similar to or same as one of the TMDS transmitters 322, 324, 326, 328 in the embodiment depicted in FIG. 3. The TMDS receiver in the embodiment depicted in FIG. 5 may be similar to or same as one of the TMDS receivers 422, 424, 426, 428 in the embodiment depicted in FIG. 4. In the embodiment depicted in FIG. 5, the two TMDS terminals belong to one of the three TMDS data channels 0, 1 and 2 and the TMDS clock channel. In other words, the RxSense module is applied to each of the TMDS data and clock channels in the embodiment depicted in FIG. 5. However, the RxSense module may be applied only to the TMDS clock channel in other embodiments. In an embodiment, the electronic device is a System on Chip (SoC) and the two TMDS terminals are pins on the chip, for example, pins of the HDMI port 102.

The RxSense module 504 includes two resistors 512, 514 and each of the two resistors is connected to a different TMDS terminal 508, 510. The two resistors may have same or different resistance values. In the embodiment depicted in FIG. 5, both of the two resistors have a resistance value of 50 kOhms. Each of the two resistors is connected to ground and is connected to a voltage detector 516, 518 where a voltage level is measured. The average of the voltage levels read by the voltage detectors is known as a TMDS common mode voltage "$V_{tcm}$." In an embodiment, each of the voltage detectors is configured to detect a voltage level as being high if the voltage level is higher than a voltage threshold. The voltage threshold may be 2.3 Volts according to the HDMI specification. The TMDS common mode voltage $V_{tcm}$ is used to detect whether the external HDMI device 118 that is attached to the HDMI port 102 is an HDMI sink. For example, the TMDS common mode voltage $V_{tcm}$ is high if the external HDMI device is an HDMI sink. In the embodiment depicted in FIG. 5, the RxSense module is connected to the control unit 106, which controls the TMDS transmitter based on the value of the TMDS common mode voltage $V_{tcm}$.

The TMDS transmitter 500 includes a current source 520 and two switches 522, 524. The control unit 106 uses the TMDS common mode voltage $V_{tcm}$ to enable the TMDS transmitter by controlling the switches. In the embodiment depicted in FIG. 5, the control unit forces the switches into open positions when the HDMI source unit 310 is not enabled. When the HDMI source unit is enabled, the TMDS transmitter uses the switches to transmit data. A differential signal can be generated by alternatively closing one of the two switches, depending on the bit value being transmitted by the TMDS transmitter.

The termination resistance control module 506 includes two termination resistors 526, 528 and two switches 530, 532, which are divided into two branches. Each of the branches includes one terminal resistor and a switch. The two branches are both connected to a link reference voltage "$AV_{cc}$." In the embodiment depicted in FIG. 5, the termination resistance control module is connected to the control unit 106, which controls the switches of the termination resistance control module. The RxSense module 504 may check whether the TMDS differential pair is pulled up on both wires by comparing the TMDS common mode voltage $V_{tcm}$ with the link reference voltage $AV_{cc}$. In an embodiment, the termination resistance control module is part of the HDMI sink unit 412. In this case, when the control unit enables the HDMI sink unit, the control unit enables the two branches of the termination resistance control module.

The TMDS receiver 502 includes a differential amplifier circuit 534 configured to process two input signals "A" and "B" and to generate an output signal "C." The two input signals A and B are the positive copy and the negative copy of the TMDS differential signal received at the TMDS terminals 508, 510. The output signal C is equal to the sign of the difference between the input signals A and B. The termination resistance control module 526 serves the TMDS receiver.

FIG. 6 shows some HDMI bus components of the electronic device 100 depicted in FIG. 1 in accordance with an embodiment of the invention. In the embodiment depicted in FIG. 6, a DDC source 600 of the HDMI source unit 310 and a DDC sink 602 of the HDMI sink unit 412 are attached to two DDC bus terminals 604, 606, which are also known as the "SCL" and "SDA" terminals. The data signal of the DDC bus is transmitted through the SDA terminal while the clock signal of the DDC bus is transmitted through the SCL terminal. The DDC source in the embodiment depicted in FIG. 6 may be similar to or same as the DDC master controller 314 in the embodiment depicted in FIG. 3. The DDC sink in the embodiment depicted in FIG. 6 may be similar to or same as the DDC slave module 415 in the embodiment depicted in FIG. 4. In an embodiment, the electronic device is a SoC and the two DDC bus terminals are pins on the SoC.

The DDC source 600 includes an EDID read module 608, a High-bandwidth Digital Content Protection (HDCP) source 610, two source pull-up resistors 612, 614 that are connected to a +5 volt (V) voltage and two switches 616, 618. HDCP is a protocol for protecting audio-visual contents over a high speed link. The HDCP protocol uses the DDC bus to establish authentication between an HDMI source and an HDMI sink by exchanging security data such as random number, public keys and link verification response. In the embodiment depicted in FIG. 6, the two source pull-up resistors have resistance values of 1.7 kOhms. The DDC sink 602 includes an EDID memory 620, an HDCP sink 622 and two switches 624, 626. In the embodiment depicted in FIG. 6, the control unit 106 controls the switches of the DDC source and the switches of the DDC sink so that the DDC sink and the DDC source are not simultaneously connected to two DDC bus terminals 604, 606. In a given time, only one of the DDC sink and the DDC source is enabled by the control unit. The DDC source is enabled if the HDMI source function of the electronic device is enabled. The DDC sink is enabled if the HDMI sink function of the electronic device is enabled. Additionally, a pull-up resistor 628 is connected to a +5 V voltage and the SCL terminal 604. In the embodiment depicted in FIG. 6, the pull-up resistor may be the sink pull-up resistor that is mandatory according to the HDMI specification and have a resistance value of 47 kOhms. Because the influence of the sink pull-up resistor is low compared the two source pull-up resistors, the sink pull-up resistor does not need to be disconnected when the DDC source is connected to the SCL terminal.

In some embodiments, the control unit 106 controls or drives only the Power supply to the HDMI source unit 310 and/or only the Power supply to the HDMI sink unit 412. In an embodiment, the control unit controls the Power supply to the TMDS transmitter 500 of the HDMI source unit. For example, the control unit controls the current source 520 of the TMDS transmitter. When the Power supply to the TMDS transmitter is terminated, the TMDS transmitter may enter a high-impedance (Hi-z) state. In another embodiment, the control unit controls the Power supply to the TMDS receiver 502 of the HDMI sink unit. When the control unit switches off the Power supply of the TMDS receiver, the HDMI sink unit may automatically disconnect the switches 530, 532 of the termination resistance control module 506 and disconnect the switches 624, 626 of the DDC sink 602.

FIG. 7 shows some HDMI connection components of the electronic device 100 depicted in FIG. 1 in accordance with an embodiment of the invention. In the embodiment depicted in FIG. 7, the Utility line, a +5V Power line, the HPD line are connected to a Utility line terminal 702, a +5V Power line terminal 704 and an HPD line terminal 706, respectively. The Utility terminal is coupled to a resistor 708 that is connected to ground. The resistor 708 is used to avoid a floating line when electronic device 100 is not connected to any external HDMI device. The resistance value of the resistor 708 is set to very high so as to not disturb any signaling. In the embodiment depicted in FIG. 7, the resistor 708 has a resistance value of 1 million (M) Ohms.

The +5V Power line terminal 704 is coupled to a 5 V voltage supply with a switch 710. The +5V Power line is used by an HDMI source to supply power to an EDID memory of an HDMI sink when the HDMI sink is powered off. Although the voltage level of the Power line is 5 volts in the embodiment depicted in FIG. 5, the voltage level of the Power line may be less than 5 volts or larger than 5 volts in other embodiments. The +5V Power supply at the +5V Power line terminal 704 may be same as the +5 V Power supply at the pull-up resistors 612, 614 and 628.

The HPD terminal 706 is coupled to an optional resistor 718 that is connected to ground. The optional resistor is used to avoid a floating line when the electronic device 100 is not connected to any external HDMI device. In the embodiment depicted in FIG. 7, the resistor has a resistance value of 1 MOhms.

The +5V Power line terminal 704 and the HPD terminal 706 are both coupled to a Hot Plug control module 712. The Hot Plug control module is part of the HDMI sink unit 412. The Hot Plug control module is configured to notify an external HDMI source that is attached to the HDMI port 102 of the electronic device 100 whether or not the external HDMI source can use the DDC bus of the electronic device. If the voltage level of the HPD signal is lower than a voltage threshold such as 0.8 V, the electronic device does not allow the external HDMI source to use the DDC bus. In this case, the external HDMI source acts as not being attached to an HDMI sink. If the voltage level of the HPD signal is higher than another voltage threshold such as 2.0 V, the electronic device allows the external HDMI source to use the DDC bus, for example, to read EDID of the electronic device. In this case, the external HDMI source acts as being attached to an HDMI sink. In the embodiment depicted in FIG. 7, the Hot Plug control module is coupled with a resistor 714 and a switch 716 that is coupled to the HPD terminal. The resistor 714 is used for the output impedance of the HPD signal. The switch 716 is used to set the HPD line to a high impendence (Hi-Z) state. The Hot Plug control module 712, the resistor 714 and the switch 716 perform similar functions to the HPD module 420.

Each of the Utility line terminal 702, the +5V Power line terminal 704 and the HPD line terminal 706 is connected to a voltage detector 720, 722, 724 that is configured to measure the voltage level of the signal in the corresponding line. In the embodiment depicted in FIG. 7, voltage detectors of the Utility line, the +5V Power line and the HPD line are connected to the control unit 106. In an embodiment, the voltage levels of the Utility signal, the Power signal and the HPD signal is expressed as high or low. The high/low threshold voltages of the Power signal and the HPD signal may be defined by the HDMI specification. In an example, the voltage threshold for the +5V Power line is 4.7 V. In another example, the voltage level of the HPD signal is deemed as being high if the voltage level is between 2.0V-5.3V and the voltage level of the HPD signal is deemed as being low if the voltage level is between 0V-0.8V. The high/low threshold voltage for the Utility signal may not be defined by the HDMI specification. In an embodiment, the high/low threshold voltage for the Utility signal is defined by the electronic device 100.

In the embodiments depicted in FIG. 5-7, if the electronic device 100 is operating in the HDMI source operational mode 204, a low signal voltage level detected on the HPD line may not indicate that the HDMI link 120 between the electronic device and the external HDMI sink 118 is unplugged. For example, the external HDMI sink may pull down the HPD line from a high level to a low level to indicate a change in content of the EDID memory of the external HDMI sink or to reset the HDCP authentication. Additionally, the HPD line may be pulled down from a high level to a low level if the DDC sink module is no longer available. The electronic device is configured to continuously check the voltage level of the Power signal in the +5V Power line and the TMDS common mode voltage from the RxSense module 504. The electronic device is switched to operate in the idle operational mode 202 if one of the two signals is detected as being low.

When the electronic device 100 is operating in the idle operational mode 202, the electronic device continuously monitors the TMDS common mode voltage, voltages of signals in the Utility line, the HPD line and the +5V Power line. The electronic device detects the external HDMI device 118 as being an HDMI sink and switches from operating in the idle operational mode to operating in the HDMI source operational mode 204 if the TMDS common mode voltage is higher than a first threshold voltage, if the voltage level of the Utility signal in the Utility line is higher than a second threshold voltage or if the voltage level of the HDP signal in the HDP line is higher than a third threshold voltage even the 5V supply is not connected to the +5V Power line. In an embodiment, the first threshold voltage is 3.0 V or 2.3 V and the second and third threshold voltages are 2.0 V. The first threshold voltage may be the same as the threshold voltage of the RxSense module 504. The electronic device detects the external HDMI device as being an HDMI source and switches from operating in the idle operational mode to operating in the HDMI sink operational mode 206 if the voltage level of the Power signal in the +5V Power line is high. If the external HDMI device is not powered, the electronic device remains in the idle operational mode.

The external HDMI device 118 may be in a state that does not allow the automatic detection of the HDMI type of the external HDMI device. For example, the external HDMI device may be turned off and show low voltage levels on the +5V Power line, the Utility line, the HPD line and the TMDS lines. In this case, the electronic device 100 may be forced to switch from operating in the idle operational mode 202 to operating in the HDMI source operational mode 204 by an end-user action or after a time out period expires when the electronic device has content to output. For example, the electronic device can periodically activate the +5V Power line and expect the external HDMI device to assert a high voltage level on the HPD line before a time period such as 100 milliseconds expires. If the external HDMI device does not assert a high voltage level on the HPD line before the time period expires, the electronic device switches back to the idle operational mode. However, when the electronic device and the external HDMI device are manufactured according to the HDMI specification, the electronic device can always automatically detect whether the external HDMI device is an HDMI source and enable the HDMI sink operational mode 206. One reason is that according to the HDMI specification, the assertion of the +5V Power line is mandatory whenever an HDMI source uses the DDC or TMDS signals.

The following table shows the status of components and characteristics of the electronic device 100 under the idle operational mode 202, the HDMI source operational mode 204 and the HDMI sink operational mode 206.

|  | Idle mode | Source mode | Sink mode |
| --- | --- | --- | --- |
| TMDS transmitter | Off | On | Off |
| TMDS receiver | Off | Off | On |
| Termination Resistance Control module | Disconnected | Disconnected | Connected |
| RxSense Module | Active | Active | Off |
| DDC Source | Disconnected | Connected | Disconnected |
| DDC Sink | Disconnected | Disconnected | Connected |
| 5 V Supply | Disconnected | Connected | Disconnected |
| +5 V Power Signal Detection | Active | Off | Active |
| Hot Plug Control | Disconnected | Disconnected | Connected |
| HPD Signal Detection | Active | Active | Off |
| Utility Signal Detection | Active | Active | Off |

Referring back to FIG. 1, the optional display unit 114 of the electronic device 100 is configured to display multimedia content from the HDMI source unit 110 and/or the HDMI sink unit 112. The display unit may be any type of display device, including but not limited to, a flat panel display, a light emitting diode (LED) display, a plasma display panel, or a liquid crystal display (LCD). In some embodiments, the electronic device includes an additional media player unit that is configured to play multimedia content on the display unit. In some embodiments, the electronic device does not include a display unit. In these embodiments, the electronic device may include a multimedia data storage unit to store multimedia data that is received through the HDMI port 102.

Figure 8:
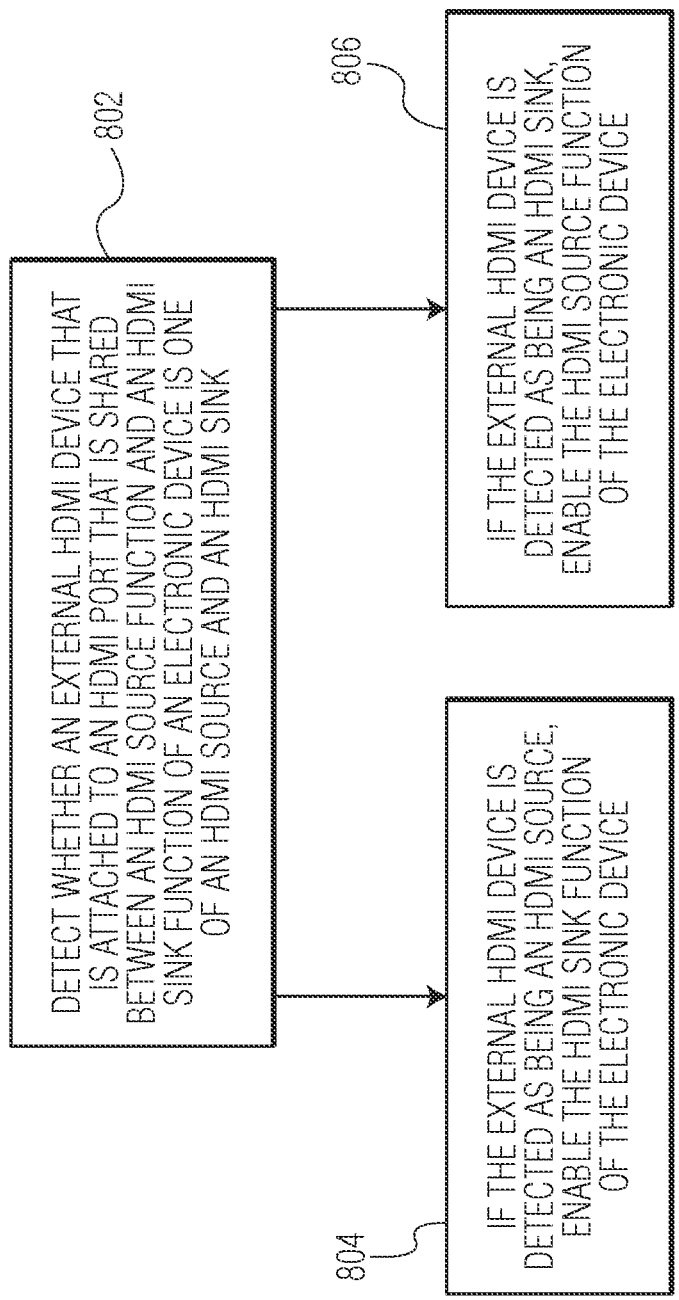
FIG. 8 is a process flow diagram of a method for operating an electronic device having an HDMI port that is shared between an HDMI source function and an HDMI sink function of the electronic device in accordance with an embodiment of the invention.

FIG. 8 is a process flow diagram of a method for operating an electronic device having an HDMI port that is shared between an HDMI source function and an HDMI sink function of the electronic device in accordance with an embodiment of the invention. At block 802, a detection is made whether an external HDMI device that is attached to the HDMI port is one of an HDMI source and an HDMI sink. At block 804, if the external HDMI device is detected as being an HDMI source, the HDMI sink function of the electronic device is enabled. At block 804, if the external HDMI device is detected as being an HDMI sink, the HDMI source function of the electronic device is enabled.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

The invention claimed is:

1. A method for operating an electronic device having a High-Definition Multimedia Interface (HDMI) port that is shared between an HDMI source function and an HDMI sink function of the electronic device, the method comprising:
    detecting whether an external HDMI device that is attached to the HDMI port is one of an HDMI source and an HDMI sink by
        detecting that the external HDMI device is an HDMI source in response to a Transition Minimized Differential Signaling (TMDS) clock channel and in response to voltage characteristics of a signal transmitted by the electronic device corresponding to known voltage characteristics of an HDMI source signal, and
        detecting that the external HDMI device is an HDMI sink in response to voltage characteristics of a signal transmitted by the electronic device corresponding to known voltage characteristics of an HDMI sink signal;
    if the external HDMI device is detected as being the HDMI source, enabling the HDMI sink function of the electronic device; and
    if the external HDMI device is detected as being the HDMI sink, enabling the HDMI source function of the electronic device.

2. The method of claim 1, wherein the detecting whether the external HDMI device that is attached to the HDMI port is one of an HDMI source and an HDMI sink comprises at least one of:
    measuring a common mode voltage of a TMDS communications channel through the HDMI port between the electronic device and the external HDMI device;
    measuring a voltage level of a Utility signal through the HDMI port between the electronic device and the external HDMI device;
    measuring a voltage level of an incoming Hot Plug Detect signal through the HDMI port between the electronic device and the external HDMI device; and
    measuring a voltage level of a Power signal through the HDMI port between the electronic device and the external HDMI device.

3. The method of claim 2, wherein the detecting whether the external HDMI device that is attached to the HDMI port is one of an HDMI source and an HDMI sink further comprises detecting the external HDMI device as being an HDMI sink if a condition is satisfied, the condition including at least one of:
    the TMDS common mode voltage is measured as being higher than a first voltage;
    the voltage level of the Utility signal is measured as being higher than a second voltage; and
    the voltage level of the incoming Hot Plug Detect signal is measured as being higher than a third voltage.

4. The method of claim 2, wherein the detecting whether the external HDMI device that is attached to the HDMI port is one of an HDMI source and an HDMI sink further comprises detecting the external HDMI device as being an HDMI source if the voltage level of the Power signal is measured as being higher than a fourth voltage.

5. The method of claim 2, wherein the TMDS communications channel is the TMDS clock channel.

6. The method of claim 1 further comprising operating the electronic device in an idle operational mode to conserve power and to monitor the HDMI port, and wherein detecting whether an external HDMI device that is attached to the HDMI port is one of an HDMI source and an HDMI sink includes:
    detecting that the external HDMI device is a sink in response to a TMDS common mode voltage on the HDMI port being is higher than a threshold indicative of an HDMI sink voltage level; and
    detecting that the external HDMI device is a source in response to a voltage level of a power signal on the HDMI port is higher than a threshold indicative of an HDMI source power level.

7. The method of claim 6 further comprising keeping the electronic device operating in the idle operational mode when the external HDMI device is powered off.

8. The method of claim 6, wherein the enabling the HDMI sink function of the electronic device comprises switching the electronic device from operating in the idle operational mode to operating in an HDMI sink operational mode in which the electronic device acts as an HDMI sink, and wherein the enabling the HDMI source function of the electronic device comprises switching the electronic device from operating in the idle operational mode to operating in an HDMI source operational mode in which the electronic device acts as an HDMI source.

9. The method of claim 8, wherein the operating the electronic device in the HDMI sink operational mode comprises receiving multimedia data signals at the electronic device from the external HDMI device via the HDMI port, and wherein the operating the electronic device in the HDMI source operational mode comprises transmitting multimedia data signals from the electronic device to the external HDMI device via the HDMI port.

10. The method of claim 8 further comprising forcing the electronic device to switch from operating in the idle operational mode to operating in the HDMI source operational mode when the external HDMI device is powered off.

11. The method of claim 8 further comprising consuming less power when the electronic device is operating in the idle operational mode than operating in the HDMI sink operational mode or in the HDMI source operational mode.

12. The method of claim 1 further comprising sharing only one HDMI port between the HDMI source function and the HDMI sink function of the electronic device.

13. An electronic device comprising:
    a High-Definition Multimedia Interface (HDMI) source unit configured to perform an HDMI source function;
    an HDMI sink unit configured to perform an HDMI sink function;
    an HDMI port that is shared between the HDMI source unit and the HDMI sink unit;
    a detecting unit configured to detect whether an external HDMI device that is attached to the HDMI port is one of an HDMI source and an HDMI sink by
        detecting that the external HDMI device is an HDMI source in response to voltage characteristics of a signal transmitted by the external HDMI device corresponding to known voltage characteristics of an HDMI source signal, and detecting that the external HDMI device is an HDMI sink in response to voltage characteristics of a signal transmitted by the external HDMI device corresponding to known voltage characteristics of an HDMI sink signal, the detecting unit being configured and arranged to provide a differential output indicative of whether a signal passed via a Transition Minimized Differential Signaling (TMDS) terminal is communicated with a HDMI source or an HDMI sink; and a control unit configured to enable the HDMI sink function of the electronic device if the external HDMI device is detected as being an HDMI source and to enable the HDMI source function of the electronic device if the external HDMI device is detected as being an HDMI sink, wherein the detecting unit is configured and arranged to determine whether the external HDMI device is an HDMI source or an HDMI sink based on
- a TMDS common mode voltage of a TMDS communications channel through the HDMI port between the electronic device and the external HDMI device;
- a voltage level of a utility signal through the HDMI port between the electronic device and the external HDMI device;
- a voltage level of an incoming hot plug detect signal through the HDMI port between the electronic device and the external HDMI device; and
- a voltage level of a power signal through the HDMI port between the electronic device and the external HDMI device.

14. The electronic device of claim 13, wherein the detecting unit is further configured to measure at least one of:
- a Transition Minimized Differential Signaling (TMDS) common mode voltage of a TMDS communications channel through the HDMI port between the electronic device and the external HDMI device;
- a voltage level of a Utility signal through the HDMI port between the electronic device and the external HDMI device;
- a voltage level of an incoming Hot Plug Detect signal through the HDMI port between the electronic device and the external HDMI device; and
- a voltage level of a Power signal through the HDMI port between the electronic device and the external HDMI device, wherein the external HDMI device is detected as being an HDMI sink if a condition is satisfied, the condition including at least one of:
the TMDS common mode voltage is measured as being higher than a first voltage;
the voltage level of the Utility signal is measured as being higher than a second voltage; and
the voltage level of the incoming Hot Plug Detect signal is measured as being higher than a third voltage,
and wherein the external HDMI device is detected as being an HDMI source if the voltage level of the Power signal is measured as being higher than a fourth voltage.

15. The electronic device of claim 14, wherein the control unit is further configured to switch the electronic device from operating in an idle operational mode in which the electronic device conserves power and monitors the HDMI port to operating in an HDMI sink operational mode by enabling the HDMI sink unit to receive multimedia data signals from the external HDMI device via the HDMI port if the external HDMI device is detected as being an HDMI source, and to switch the electronic device from operating in the idle operational mode to operating in an HDMI source operational mode by enabling the HDMI source unit to transmit multimedia data signals to the external HDMI device via the HDMI port if the external HDMI device is detected as being an HDMI sink, wherein the electronic device is configured to consume less power operating in the idle operational mode than operating in the HDMI sink operational mode or in the HDMI source operational mode, and wherein the HDMI port is the only HDMI port that is shared between the HDMI source function and the HDMI sink function of the electronic device.

16. The method of claim 1, wherein detecting whether an external HDMI device that is attached to the HDMI port is one of an HDMI source and an HDMI sink includes:
communicating signals with the external HDMI device prior to detecting whether the external HDMI device is an HDMI source or an HDMI sink, and
determining whether the external HDMI device is an HDMI source or an HDMI sink based upon the communicated signals.

17. The device of claim 13, wherein the detecting unit is configured and arranged to detect whether an external HDMI device that is attached to the HDMI port is one of an HDMI source and an HDMI sink by:
communicating signals with the external HDMI device prior to detecting whether the external HDMI device is an HDMI source or an HDMI sink, and
determining whether the external HDMI device is an HDMI source or an HDMI sink based upon the communicated signals, by
detecting that the external HDMI device is a sink in response to the signals including a TMDS common mode voltage that is higher than a threshold indicative of an HDMI sink voltage level; and
detecting that the external HDMI device is a source in response to a voltage level of the signals being higher than a threshold level indicative of an HDMI source power level.

18. An electronic device comprising:
a High-Definition Multimedia Interface (HDMI) source unit configured to perform an HDMI source function;
an HDMI sink unit configured to perform an HDMI sink function;
an HDMI port that is shared between the HDMI source unit and the HDMI sink unit;
a detecting unit configured to detect whether an external HDMI device that is attached to the HDMI port is one of an HDMI source and an HDMI sink by
detecting that the external HDMI device is an HDMI source in response to voltage characteristics of a signal transmitted by the external HDMI device corresponding to known voltage characteristics of an HDMI source signal, and
detecting that the external HDMI device is an HDMI sink in response to voltage characteristics of a signal transmitted by the external HDMI device corresponding to known voltage characteristics of an HDMI sink signal; and
a control unit configured to enable the HDMI sink function of the electronic device if the external HDMI device is detected as being an HDMI source and to enable the HDMI source function of the electronic device if the external HDMI device is detected as being an HDMI sink, wherein the detecting unit includes first and second voltage detectors coupled to first and second TMDS terminals, and first and second resistors respectively connected to the first and second voltage detectors, the voltage detectors and resistors being configured and arranged to provide a differential output indicative of whether a signal passed via the TMDS terminals is communicated with a HDMI source or an HDMI sink.

19. An electronic device comprising:

a High-Definition Multimedia Interface (HDMI) source circuit configured and arranged to perform an HDMI source function;

an HDMI sink circuit configured and arranged to perform an HDMI sink function;

an HDMI port that is shared between the HDMI source circuit and the HDMI sink circuit;

a detecting circuit including first and second voltage detectors coupled to first and second Transition Minimized Differential Signaling (TMDS) terminals, and first and second resistors respectively connected to the first and second voltage detectors, the voltage detectors and resistors being configured and arranged to provide a differential output indicative of whether a signal passed via the TMDS terminals is communicated with the HDMI source or the HDMI sink; and a control unit configured to enable the HDMI sink circuit in response to the differential output being indicative that the signal is from an HDMI source, and to enable the HDMI source circuit in response to the differential output being indicative that the signal is from an HDMI sink.

* * * * *